UNITED STATES PATENT OFFICE.

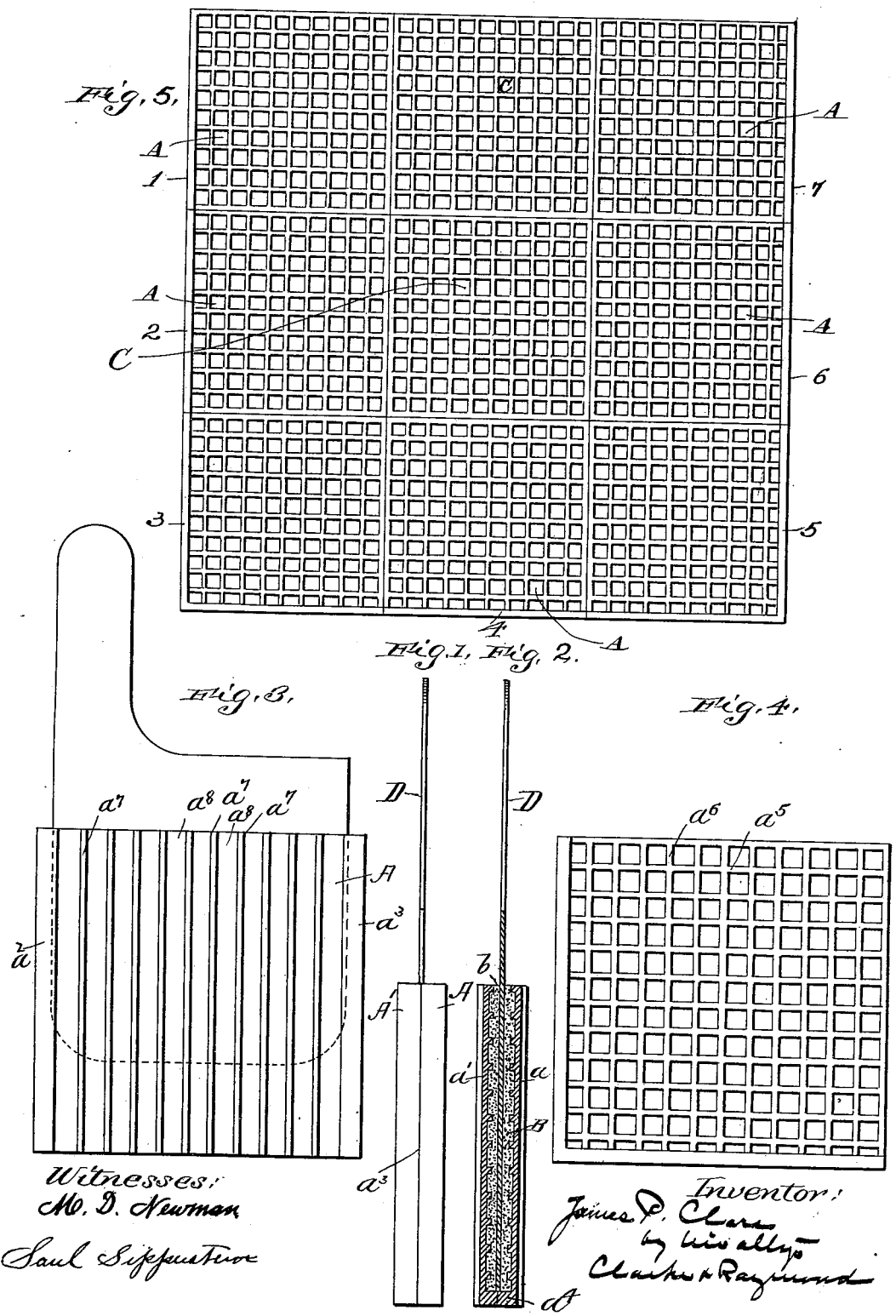

JAMES P. CLARE, OF QUINCY, MASSACHUSETTS.

SECONDARY BATTERY.

SPECIFICATION forming part of Letters Patent No. 650,808, dated May 29, 1900.

Application filed November 22, 1899. Serial No. 737,936. (No model.)

*To all whom it may concern:*

Be it known that I, JAMES P. CLARE, a citizen of the United States, and a resident of Quincy, Massachusetts, have invented certain Improvements in Secondary or Storage Batteries, of which the following is a specification.

The invention consists in the herein-described improvement in secondary or storage batteries and will be described in connection with the drawings, wherein—

Figure 1 is a view in end elevation of a complete electrode or unit. Fig. 2 is a view in vertical section thereof. Fig. 3 is a view in side elevation of the electrode or unit. Fig. 4 is a view in side elevation of one of the plates of the electrode or unit, showing its inner surface. Fig. 5 is a view, also in elevation and in reduced size, of a side of an electrode composed of a number of independent plates assembled to form a portion of a larger electrode than is represented in the other figures.

My invention consists in a construction of the plates of the electrode, whether used in pairs or multiple, whereby a chamber is formed between the plates which is completely closed upon three sides or edges and open upon one only and by means integral or homogeneous with the substance or body of the plates.

Referring to the drawings, A represents one of the plates of a single electrode or unit, and A' the other plate of the single electrode or unit. The plates are formed to provide the side walls $a$ $a'$, the end walls $a^2$ $a^3$, and the closed bottom $a^4$ of a chamber or cavity B and to also provide an opening $b$ thereto. The inner surface $a^5$ between the end walls may be cellular in shape or character, and I have shown such cells as obtained by vertical and horizontal narrow walls $a^6$, which intersect. The exterior of each plate between the ends may have a series of ribs $a^7$, parallel with the ends and forming channels $a^8$. The surfaces of these ribs are flush with the surfaces of the ends.

The plates are made of porous non-conducting earthenware, and therefore provide a box or vessel having its sides, bottom, and ends of homogeneous porous non-conducting material. The sections of the plates which form the ends and bottom of the chamber are united by means of a suitable cement, so that the chamber of the box, vessel, or unit is practically fluid-tight and serves to hold within its confines any material, ingredient, or fluid with which its cavity may be filled and as long as there may be any ingredient, material, or fluid in the cavity, the ends and bottom of the vessel or unit being of the material of the sides and being indestructible by the usual influences of said batteries. The wall which forms the ends and bottom of the vessel or unit may be of any desired extent, and I have represented in the drawings as one method of obtaining the same in a single electrode or unit a construction in which each side contributes its portion of wall along each end and the bottom, the ends and the bottom being extended with respect to the inner surfaces of the plates to provide wall-forming parts. These wall-forming extensions are made relatively wide, so as to form substantial cementing and abutting surfaces, and also serve to strengthen the structure of the plate. When the vessel or electrode is composed of a number of plates, only those which form the outer and lower side are provided with the wall-forming extensions. In Fig. 5, for instance, where nine plates are represented as assembled, the plates 1, 2, 3, 4, 5, 6, and 7 are provided with sections or parts of a wall on their outer edges, the plates 1, 2, 4, 6, and 7 having wall-sections on one edge only and the plates 3 and 5, being corner plates, having wall-forming extensions on two edges.

Where the vessel is composed of a number of plates associated as represented in Fig. 5, the two sides are cemented together and the plates cemented to each other, so that a closed vessel in every respect like that made from a pair of plates, excepting that it is larger, is obtained. The advantage of this construction, in which the walls of the chamber are built up of a number of sections A, cemented together at their meeting or abutting edges, over the built-up walls now in use is that said sections when joined by acid-proof cement form a rigid practically-homogeneous wall with absolutely-tight joints, and the plate thus formed may be cemented as a single unit or sheet at its bottom and sides to its opposing unit or sheet to form the chamber. I am able by this construction to dispense with the binding-plates, straps, and other tying devices which are found in the built-up loose-jointed multiple-section plates now in use to secure the sections in relative position and prevent their displacement, it being understood, of course, that in forming walls or plates for electrode-receptacles of any considerable size it is necessary to build them up of comparatively-small molded sections, for the reason that large plates cannot be successfully molded and dried, because of the liability of distortion or curling during drying. In cementing the plates any cement capable of resisting the attacks of the acid of the battery may be used.

In the chamber of the closed vessel there is first placed lead oxid or material to become active, which is lettered C, and into this material is then inserted a lead-conducting sheet D, while the active material or material to become active is in a soft, plastic, and formative condition. By this means all the active material placed in the chamber of the unit or vessel is held in the said chamber, and therefore cannot escape therefrom into the receptacle or jar containing the units or vessels, and thereby interfere with the efficiency of the battery or become otherwise wasted.

Having thus fully described my invention, I claim and desire to secure by Letters Patent of the United States—

In a storage battery, a receptacle for the active ingredients or substances the sides of which are formed of porous plates or walls built up of a plurality of sections cemented together at their abutting edges by an acid-proof cement so as to make solid practically-homogeneous plates, the outer sections of said plates at one or more sides thereof having integral, lateral extensions at their outer edges, said extensions abutting when the said built-up plates are opposed to each other and being united by an acid-proof cement.

In testimony whereof I have affixed my signature in presence of two witnesses.

JAMES P. CLARE.

Witnesses:
ELLIE J. McNULTY,
JAMES L. EDWARDS.